July 29, 1952    D. R. CORNELL    2,604,801
APPARATUS FOR FORGING RAILWAY AXLES
Filed Nov. 17, 1948    2 SHEETS—SHEET 1
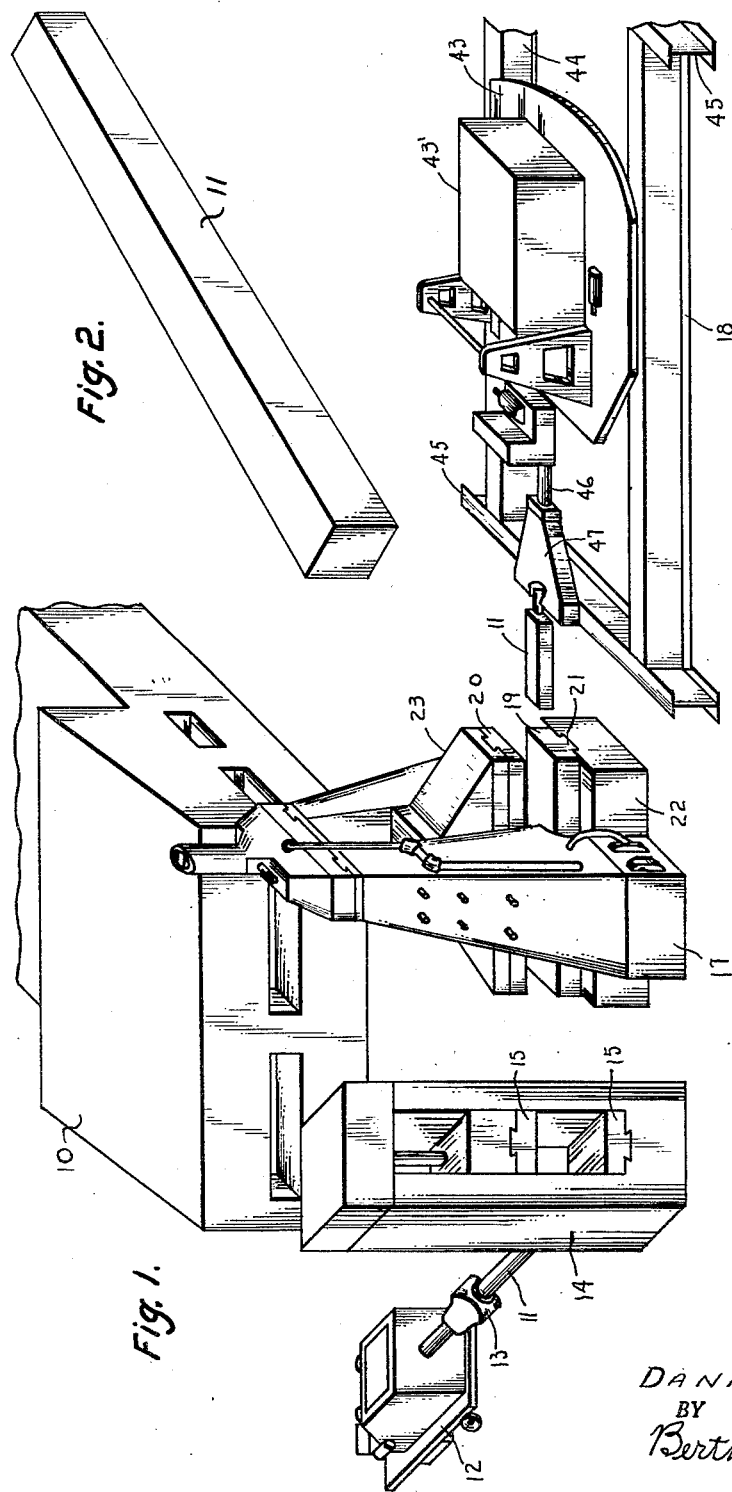
INVENTOR.
DANA R. CORNELL
BY
Bertha L. MacGregor
Attorney Patented July 29, 1952

2,604,801

UNITED STATES PATENT OFFICE 2,604,801

APPARATUS FOR FORGING RAILWAY AXLES

Dana R. Cornell, East Chicago, Ind., assignor to Standard Forgings Corporation, Chicago, Ill., a corporation of Delaware Application November 17, 1948, Serial No. 60,519

1 Claim. (Cl. 78—74)

This invention relates to apparatus for forging railway axles, and the application is a continuation-in-part of my co-pending application Serial No. 703,528, filed November 8, 1946, for Method and Apparatus for Producing Forged Railway Axles, and now abandoned.

Due to the heavy strain imposed on modern railway equipment, which must be relatively light to conform to high speed requirements and yet capable of carrying heavy loads, the demand for perfection in such equipment including axles is far beyond the requirements of the past. One of the essential requirements, for example, of the modern railway axles is substantial freedom from eccentricity.

The Axle Research Committee of the A. A. R. has recommended that eccentricity of axles be limited to not to exceed 1/8 inch, by which is meant not more than 1/4 inch total throw in the body of the axles. Axle manufacturers have found that this tolerance cannot be adhered to in forged axles produced by methods now in use, and that when the eccentricity limitation is made a part of the specifications, the forged axles must be machined, after forging, to meet the requirement.

Rough machining of the central portion of the as-forged axle is the only means heretofore employed to obtain the desired concentricity, and this is objectionable both to manufacturers and the railroads because of the added cost of the machining and the material taken off, and because tool marks from machine turning create another objectionable condition, namely, the forming of transverse ridges and valleys in the rough machined portion which contributes to fatigue failures in the axles so machined.

By the use of the method and apparatus herein described, I am able to produce railway axles which have certain highly desirable qualities not heretofore attainable by known forging methods and apparatus. These qualities include: (1) close conformation in axle dimensions and contour to the specifications of the A. A. R.; (2) concentricity of the axle as forged and freedom from transverse concentric ridges and valleys such as result when the center is subjected to rough machining to obtain desired concentricity; (3) elimination of all gouged out sections, clip marks, irregular surfaces and other surface defects which appeared in the billet; (4) finer grain and superior toughness of the metal of the finished forging; (5) continuous and undistorted longitudinally extending grain flow lines; and (6) uniformity of all axles produced by the method. In addition to the improvements in axles produced by my method, other valuable results are attained. These include: (7) saving in metal; (8) saving in fuel required for heating the metal to forging temperature; (9) saving in heating and forging time; (10) saving in labor required; and (11) saving in cost and time due to elimination of machining operations heretofore required.

An object of the invention is to produce, by forging, solid heavy duty railway axles having smooth forged tapered centers, the dimensions of the axles as forged being close to those of the finished axles, whereby a substantial saving in billet weight and in machining operations is effected.

Another object of the invention is to provide positive means for forging axles of the character described which have diametrical roundness throughout their length, and are free from eccentricity which exceeds the limit recommended by the Association of American Railroads.

It has been found in accordance with the present invention that an axle having the desirable qualities hereinbefore outlined can be formed within a single heating to a relatively low temperature by maintaining upon the billet a positive continuous rotational torque, and a frequency of hammer operation of 50 to 90 blows per minute while rotating the billet at a speed between 6 and 11 R. P. M.

Preferably the speed and frequency of hammer blows should be close to the lower figure for initial forging steps and should approach the upper limit of speed and frequency for the finish forging.

The saving in fuel required for heating billets, and the restriction of the forging temperature as hereinafter described, are important not only in the interests of economy but also because the lower the forging temperature is within plastic limits, the finer and tougher the grain of the steel will be. It has been customary heretofore to heat billets to 2150° F. or more in order to complete the forging operations at approximately 1750° F., without reheating. I have been able, by my method, to reduce the heating to 2000° F., and to finish forge at approximately 1750° F. without reheating. Others have attempted to produce forged axles from billets heated to less than 2150° F. by methods differing from the one claimed herein, but have not been able to complete the forging without reheating or resorting to upsetting operations to complete the shaping of the forged axle. Reheating is costly in time and fuel, and upsetting operations after reheating cause serious coarsening of the grain size over that established in the original forging.

The highest temperature to which the steel is heated before forging is conducive to coarsened grain size, larger at high temperatures and smaller at lower temperatures. The final grain size in the steel after forging, is dependent on the final temperature at which forging work is completed. The speed of my forging process makes it possible to limit the high grain coarsening temperature for heating the billet in the forgeable temperature range and narrows the range between initial temperature heated and the final finish forged temperature, so that finer grain size is assured in each axle. In other words, my process makes possible, for the first time, a commercially practical production of axles of the best quality including a more refined grain size.

By avoiding upsetting operations in my forged axles I maintain the uniform grain flow lines established by the forging operations in longitudinally extending unbroken and undistorted condition. Further, by avoiding the necessity of machining the smooth forged tapered centers, and by reducing to a minimum machining operations on the journals and wheel seats, I retain in the forged axles produced by my invention, the "as forged" outer layer of metal which experience has proved to be highly resistant to fatigue failure, produced by high speed forging of the entire billet, simultaneously, coupled with continuous rotation of the billets and partially forged axles while they are supported on full length anvil dies.

The means I have provided for rotating the forgings while they are being subjected to the forging blows of a steam drop hammer are such that the operation of the hammer is not slowed or interrupted by the rotating means. Heretofore the rotating or turning of the forging in a steam drop hammer has been accomplished intermittently, between hammer blows, either manually or by turning devices associated with and controlled by the operation of the reciprocating hammer or press. All these older methods require interruption of the forging operation, or relatively slow operation, in order to permit the turning means to function.

My rotating means are independent of the forging mechanism, and continuous in operation. The speeds of operation of the forging hammer and of the rotation imparting mechanism may be varied and controlled independently of each other. The rotary driving force is applied to one end of the billet or forging outwardly beyond one end of the forging dies, whereby it is possible for me to use axle impression dies provided with substantially closed ends for the final forging step. This feature of construction not only aids in retaining forging temperature in the metal but also confines the metal and controls longitudinal movement thereof to the end that the die cavities are completely and compactly filled radially. This is important in attaining the close to specified contour of the axle, freedom from gouged out surfaces, chip marks, and other irregularities which detract from the smooth forged surface required, and in obtaining the degree of concentricity and freedom from eccentricity required by A. A. R. specifications, not heretofore attainable without machining and consequent increase in cost and waste.

Due to the use of the apparatus and method herein disclosed, production may be increased from two to three times the present rate of production without a corresponding increase in labor.

In the drawings:

Fig. 1 is a perspective view of apparatus employed in forging railway axles according to the method of my invention, showing the floor plan and arrangement of the steam drop hammer and other apparatus but eliminating details of construction shown in other views.

Fig. 2 is a perspective view of a billet to be forged into axle form.

Fig. 3 is an elevational, fragmentary view of the billet and tong-hold on one end thereof.

Fig. 4 is an elevational view of the forged axle as it appears at the end of the forging operation, before the tong-hold and surplus end have been cut off.

Figure 5:
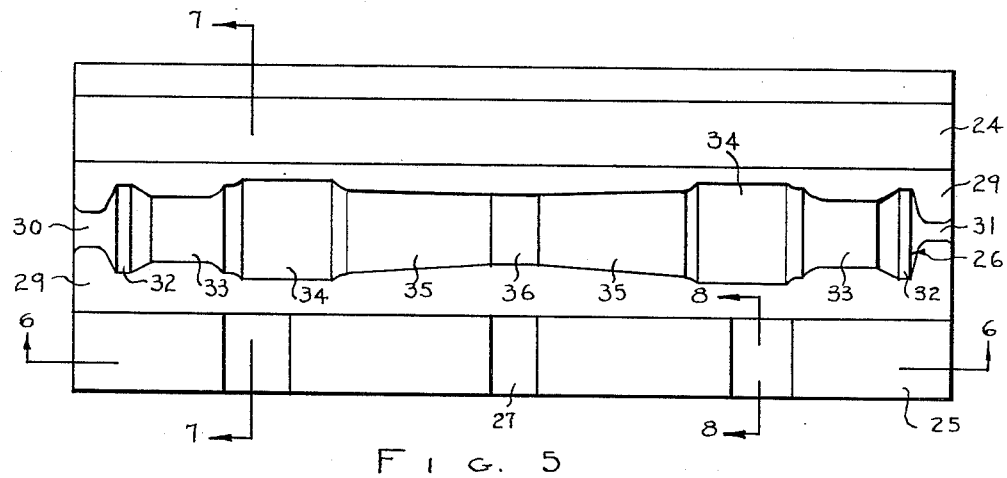
Fig. 5 is a top plan view of the anvil die which comprises the corner rounding groove, the tapered center forming and lengthening groove and the axle impression groove.

*Apparatus.*—The apparatus which I prefer to use in practicing my method of producing forged railway axles is arranged as shown in Fig. 1. It comprises a continuous furnace 10 through which the billets 11 are moved, and a floor type manipulator 12 provided with billet gripping means 13 for conveying billets 11 from the furnace 10 to tong-hold press 14 located conveniently near the furnace. The tong-hold press 14 comprises cooperating upper and lower dies 15 between which one end of the billet is pressed to reduce the end and to form a tong-hold 16 as shown in Fig. 3. The dies 15 need not be provided with any special forming surfaces. The end of the billet is squeezed between the proximate faces of the dies 15 and the tong-hold of reduced thickness is thus formed. The apparatus also comprises a steam drop hammer 17 located to receive billets from the tong-hold press 14, and a forging manipulator 18 located conveniently adjacent the steam drop hammer 17 for the purpose of rotating the billets while they are being forged between the hammer dies.

The drop hammer 17 is provided with an anvil die 19 and a reciprocating hammer die 20. These are mounted in the drop hammer by any well known means, such as the key 21 on anvil die 19 engaged in a groove in the base 22 of the hammer and a similar key on the hammer die 20 engaged by the reciprocating ram 23.

The anvil die 19 comprises a corner-rounding groove 24, a tapered center forming and lengthening groove 25 and an axle impression groove 26.

The corner-rounding groove 24 is of uniform width, depth and cross sectional contour throughout the length of the groove, which extends from end to end of the anvil die.

Figure 6:
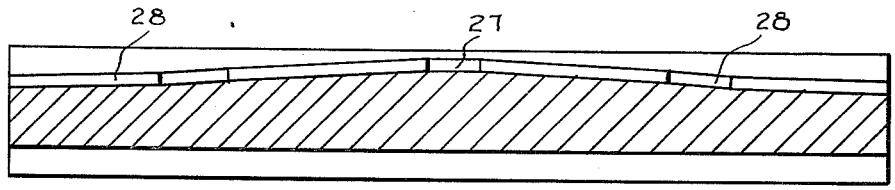
Fig. 6 is a vertical, longitudinal sectional view of the tapered center forming and lengthening portion of the anvil die, taken in the plane of the line 6—6 of Fig. 5.
Figure 8:
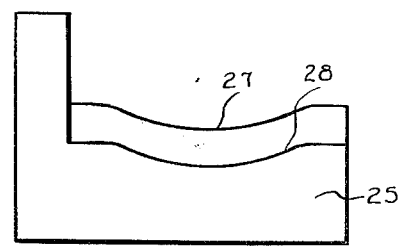
Fig. 8 is a vertical transverse sectional view on an enlarged scale, of the tapered center forming portion of the die, taken in the plane of the line 8—8 of Fig. 5.

The tapered center forming and lengthening groove 25 is transversely concave as shown in Fig. 8 but the curved floor of the groove is inclined downwardly from the center 27 toward the opposite ends of the die as indicated by the inclined surfaces 28, 28, Fig. 6, which are substantially complemental in form to the tapered center of the axle to be produced.

The axle impression groove 26 is contoured to be complemental to the axle to be forged and is adapted to receive a little less than one-half of the axle when horizontally disposed. In other words, the depth of the axle impression groove 26 varies at different points of its length and is slightly less than half of the diameter of the axle supported at a given point. The axle impression groove 26 in this embodiment of the invention is located between the grooves 24 and 25, and the ends of the groove 26 are substantially closed by end walls 29 provided with restricted openings. One end wall 29 is provided with a semi-circular opening 30 adapted to receive the lower half of the tong-hold 16 on the axle end, and the other end wall 29 is provided with a semi-circular opening 31 which serves as a gate for the surplus metal of the billet which is worked out through the die opening. Between these ends 29, the axle impression groove is contoured to shape the axle to finished form, as indicated by the cavities 32, 33, 34, 35, and 36 which shape the collars, journals, wheel seats, tapered center portions and center, respectively.

Figure 7:
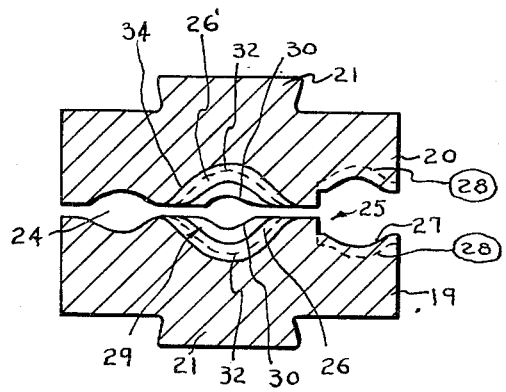
Fig. 7 is a vertical transverse sectional view of hammer and anvil dies, detached from the drop hammer, the plane of the section being indicated by the dotted line 7—7 of Fig. 5.

The reciprocating hammer die 20 preferably is contoured to correspond with the anvil die 19, but inverted with respect thereto, as shown in Fig. 7. However, it is not essential that the hammer die match the anvil die conformations exactly. Only the anvil die need be provided with the described grooves whereby the exact contour thereof is imparted to the rotated billet or forging. When the billet is resting in the groove 24 or the groove 25, the cooperating dies 19 and 20 are spaced apart to a greater extent than is indicated in Fig. 7, but when the partially formed axle is supported in the axle impression groove 26 the cooperating dies approach each other as indicated in that figure.

The cavity formed by the axle impression groove 26 of the anvil die 19 and the axle impression groove 26' of the hammer die 20 corresponds in dimensions and contour to the axle to be formed, as shown in Fig. 4, wherein the axle, at the end of the forging operation, comprises collars 37, journals 38, wheel seats 39, tapered center portions 40, center 41, the tong-hold 16 at one end and surplus 42 at the opposite end.

Reverting to Fig. 1, the manipulator 18 comprises mechanism for imparting continuous rotary motion in either direction to the billet, at selected speeds up to 11 R. P. M., preferably between 6 and 11 R. P. M., and means for moving the mechanism support relatively to the drop hammer for convenient handling of the billets by the manipulator.

Preferably the manipulator comprises a platform 43 movable longitudinally of the supporting rails 44, 44, the latter being adjustably positioned in cross rails 45, 45 adjacent the drop hammer 17. The platform 43 supports a housing 43' which encloses any suitable power transmission mechanism for imparting rotary motion in either direction to the shaft 46 on which are mounted the gripping jaws 47 for engaging the billet tong-hold 16. The shaft 46 and jaws 47 are movable axially of the shaft with platform 43', and vertically by independent means, to move the jaws toward and away from the hammer as required for engaging and disengaging the tong-hold and positioning the billet in the dies. Since the details of construction of the rotary motion imparting mechanism and the reciprocating mechanism for moving the shaft 46 longitudinally do not constitute the subject matter of this invention and may be varied, it is believed unnecessary to show the same.

Suffice to say that any speed controlled continuous rotary motion transmission mechanism, capable of rotating a billet of axle weight while resting on an anvil die, and provided with clutch slipping means which becomes operative when the rotative movement of the billet is retarded for a fractional part of a second due to hammer and billet contact, will serve the purposes of this part of the apparatus.

*Method.*—The first step in my method is the selection of a billet such as the billet 11 shown in Fig. 1. This billet has a cross sectional form consisting of a square with rounded corners. The length of the billet is regulated by the weight required to make the axle of the desired dimensions. For example, to produce a standard 6" x 11" A. A. R. freight car axle, I employ a billet having an average weight of 1140 lbs. and a minimum weight of 1110 lbs., approximately 77 inches long and 7¼" wide and deep; that is, the cross sectional dimensions of the round cornered square are 7¼ x 7¼". In methods heretofore employed, the weight of the billet required for the same freight car axle was 1185 lbs. average, 1160 lbs. minimum; size of the square 8½" x 8½", and length approximately 58 inches.

Next the billets are heated in a continuous furnace such as shown at 10 in Fig. 1, according to well known methods, being moved at required intervals, one at a time, through the length of the furnace. Instead of heating to 2150° F., as heretofore in order to finish forge while the metal remains sufficiently plastic, which requires a temperature of approximately 1750° F., my method requires heating to only 2000° F. in order to finish forge at said temperature of 1750° F. without reheating. The achievement of the complete forging operation within the temperature range of 2000° F. to 1750° F., whereby substantial savings in production cost and superior quality of product are attained, is made possible by carrying out the following described steps at a high rate of speed and in quick succession.

After the heating to approximately 2000° F. as described, the hot billet is picked up by means of the floor type manipulator 12 and carried to the press 14 for making the tong-hold 16 on one end of the billet 11. This is done by squeezing in a series of strokes about three inches at one end of the billet between the dies 15 to a smaller cross section, whereby a tong-hold 10 inches long and 4 by 4 inches in width is produced.

Heretofore, in the forging of railway axles, the billet has been turned manually or by means of mechanism such as tongs or lifters associated with the ram of the forging hammer or press. Such methods and devices have resulted in intermittent rotation or in slowing or interrupting the operation of the forging machinery. Rotary motion has also been imparted to the work in various kinds of metal working operations such as grinding, polishing, swaging and the like, through means such as head and tail stocks which engaged opposite ends of the work while the grinding, polishing, etc. was being done. Many of these operations have been directed to articles such as shafts, shells, rolls and the like. In the axle forging field, turning devices have been applied to the ends of billets, unreduced in cross sectional dimensions, or to intermediate portions. It has not been proposed, heretofore, to reduce a small portion of the billet, at one end, say about three inches, to form a reduced tong-hold of approximately ten inches, accessible exteriorly of the anvil and hammer dies, for actuation by rotary motion imparting mechanism entirely independent of the hammer operation. This independence of the rotary motion imparting mechanism obviates all interruption of the forging apparatus and permits the rate of application of the forging blows to be varied and to be gradually increased in succeeding steps of the forging operation.

Forming the tong-hold 16 of relatively small cross section as compared to the diameter of the billet, whereby the billet can be rotated substantially continuously at desired speeds by means independent of the forging apparatus and in a manner which does not require interruption of or interference with the high speed operation of the hammer, is an important feature of my method, as will be understood from a description of the whole procedure.

The floor type manipulator 12 grips the tong-hold and places the billet lengthwise in the groove 24 of the anvil die 19 to be worked on by the drop hammer die 20 for rounding the corners of the billet. Since the groove 24 is of uniform cross sectional contour, the billet need not be centered between the groove ends. The manipulator 18, by means of its jaws 47, engages the tong-hold 16 of the hot billet and rotates the billet during the corner rounding and succeeding steps of the forging operation.

The manipulator shaft 46, carrying the jaws 47, is continuously rotated in a clockwise or counterclockwise direction by the power driven mechanism in the housing 44, at any desired speed, preferably between 6 and 11 R. P. M. The application of the rotative driving force on the shaft 46 is continuous. Any suitable power, motor or other, drives the mechanism in the housing 44. The continuous rotary motion is transmitted to the billet 11 through the tong-hold 16 gripped in the jaws 47, and the billet is rotated at selected manipulator speed, as it rests on the anvil die 19, throughout the forging operation excepting during the fractional part of a second when the rotation is retarded by contact of the hammer die 20 with the billet. During this fractional part of a second, slipping takes place in the manipulator tong clutch or between the billet tong-hold and manipulator jaws 47.

Preferably, for the corner-rounding operation in the anvil groove 24, I employ rotation of the billet at manipulator speed of 7½ R. P. M. and hammer operation at a rate of 60 blows per minute for a period of 15 seconds.

Next the rounded billet is moved to the groove 25 of the anvil die 19 for performing the step of reducing the cross sectional dimensions of the billet and making the center portion thereof assume approximately the final shape of the tapered center of the railway axle at this point. The surfaces 27 and 28 of the anvil portion 25 of the die are contoured to impart the desired tapered form to the center portion of the billet. The effect of the hammer die 20 striking the billet while thus supported on the anvil 25 while being rotated about its longitudinal axis increases the length of the billet to nearly the length of the finished axle.

Preferably, for this forming of the tapered center and lengthening of the billet, I employ rotation of the billet at manipulator speed of 7½ R. P. M. and hammer blows delivered at the rate of 60 per minute for a period of 30 seconds.

When the billet has thus been reduced in cross sectional dimensions to approximately the final shape of the axle in its central tapered portion, and lengthened to nearly the finished axle length, it is moved to the axle-impression portion 26 of the die 19 where the hammer die 20 strikes the hot metal and still further lengthens the stock and rounds it so that the die is completely filled.

The axle impression groove 26 in the lower die 19 is arranged so that the tong-hold 16 on the billet extends beyond the die wall 29 and can be grasped by the manipulator jaws 47. At the opposite end the gate 31 receives the surplus stock 42 as it is worked out by the forging strokes of the hammer. The exact contour of each part of the axle need be maintained only in the bottom half 26 of the cooperating upper and lower dies. Since the hammer or upper die 20 strikes the heated billet while it is being rotated substantially continuously about its axis and is supported on the lower die, said die imparts to the billet its intended form closely approximating the finished axle design.

Preferably, for this finish forging, that is the shaping of the forging closely to finished axle form, I employ rotation of the billet at manipulator speed of 10 R. P. M. and hammer blows delivered at the rate of 80 per minute for a period of 110 seconds.

Preferably the manipulator rotation is varied to maintain rotation at the rate of approximately one-eighth of a revolution of the billet per blow of the hammer die.

A full sized standard railway axle can be produced efficiently and economically by this method in a 25,000 lb. steam drop hammer, with the savings in weight of stock and in fuel required for heating, as well as the other advantages heretofore described. The average forging time in seconds, per forging, in production of a standard 6 x 11 railway axle, is 110 seconds in the finish groove 26 and 165 seconds for the complete furnace to floor time procedure. The average number of hammer blows on the billet in the finish groove is 145 and the average total number of hammer blows per forging is 190.

The successive forging steps are applied to the entire body of the billet during each step, and thus the grain flow lines established in the billet are maintained throughout the process. The grain flow lines nearest the surface follow its contour but those within the body of metal are substantially parallel to the axis of the axle. The uniform working of the entire body of the metal by each forging stroke, through pressure applied laterally of the longitudinal axis of the billet, produces an axle of superior quality and durability.

Substantially continuous rotation of the billet, coupled with speedy and uninterrupted hammer operation, with forging blows delivered to the entire billet simultaneously, all contribute to achievement of the objects of my invention, namely; the completion of the forging operation without reheating within the narrow temperature range of 250° F. with a top limit of approximately 2000° F., whereby economy in production and superior fineness and toughness of metal in the forged axles are assured.

Further, these method steps including the forging steps of forming the smooth tapered center, followed by forging to finished axle form, with substantially continuous rotation, while controlling the lengthening of the billet, insure radial compactness and a high degree of concentricity in the finished axles without added machining of the "as forged" axles.

To finish the forged axle, the tong-hold 16 and the surplus stock 42 at opposite ends of the forging are cut off, and a minimum of machining is required to reduce by machining the journals and wheel seats to predetermined size and contour.

The described method produces railway axles having fine grain structure, and this denotes superior quality and toughness, and less tendency of the metal to rupture or break under strains, as compared to coarser grained structures found in specimens produced from metal heated to 2150° F., or to the higher temperatures generally employed heretofore. The grain structure of as-forged steel, after cooling from forging temperatures without subsequent heat treatment, is non-uniform; however, the grain sizes in the metal of axles produced by my method are substantially finer or smaller than those in axles produced from billets heated to 2150° F. or more. The largest individual grain in the 2000° F. specimen is considerably smaller than the largest individual grain found in a 2150° F. specimen.

The as-forged grain condition is affected by chemical characteristics of metal, heat characteristics, holding time at forging temperatures, amount of reduction in forging and rate of cooling; but when these factors are equal in methods which differ only as to the heating of the billet, to 2000° F. or 2150° F., the grain structure of the lower temperature specimen is substantially finer and its toughness substantially greater than the higher temperature specimen.

The method described, including the forging of the rotated billet simultaneously throughout its length, in circumferential increments successively exposed to hammer blows, results in the production of uniform metal structure both around the circumference of the axle and throughout its length. The fact that the billet is axially stationary during the forging and subjected to blows from end to end simultaneously while being rotated, aids in concentric contour shaping and forming a tough unbroken outer layer of metal on the surface of the axle, readily distinguishable from the non-uniform structure and irregular surface of the forgings produced by methods which involve lifting of the billet and non-continuous rotation and interrupted forging of the billet. This tough, unbroken outer layer is 1/8 to 1/4 inch thick.

This method enables me to produce railway axles of various contours and sizes, and the apparatus described may be adapted for such purpose by obvious changes in the axle-impression contour 26 of the bottom die 19, and without departing from the scope of my invention as set forth in the appended claim.

I claim:

In an apparatus for forging solid heavy duty railway axles having substantially the shape and dimensions of the finished axle which is provided with a tong-hold extension at one end thereof, said apparatus including an anvil die member and a reciprocating hammer die member, said die members having opposed elongated axle impression grooves of different diameters along their lengths and end walls for confining the forging longitudinally thereof, said end walls each having a restricted opening therein extending therethrough and said openings being of materially different diameters, the wall opening of larger diameter being of a size to closely receive the tong-hold extension at one end of the axle forging, and the wall opening of materially less diameter providing a restricted metal escape passage at the opposite end of the forging, both of said openings being of substantially less diameter than the smallest diameter of the axle impression grooves.

DANA R. CORNELL.

REFERENCES CITED

The following references are of record in the file of this patent:

UNITED STATES PATENTS

| Number | Name | Date |
|---|---|---|
| 156,295 | Kerr | Oct. 27, 1874 |
| 299,431 | Smith | May 27, 1884 |
| 1,281,393 | Kendall | Oct. 15, 1918 |
| 2,212,903 | Steigerwalt | Aug. 27, 1940 |
| 2,512,484 | Cornell | June 20, 1950 |

FOREIGN PATENTS

| Number | Country | Date |
|---|---|---|
| 21,736 | Great Britain | Oct. 2, 1906 |